(12) United States Patent
Kuckelkorn et al.

(10) Patent No.: US 7,552,726 B2
(45) Date of Patent: Jun. 30, 2009

(54) TUBULAR RADIATION ABSORBING DEVICE FOR SOLAR HEATING APPLICATIONS

(75) Inventors: Thomas Kuckelkorn, Weiden (DE); Nikolaus Benz, Weiden (DE)

(73) Assignee: Schott AG, Mainz (DE)

( * ) Notice: Subject to any disclaimer, the term of this patent is extended or adjusted under 35 U.S.C. 154(b) by 140 days.

(21) Appl. No.: 11/410,744

(22) Filed: Apr. 25, 2006

(65) Prior Publication Data

US 2007/0034204 A1 Feb. 15, 2007

(30) Foreign Application Priority Data

May 9, 2005 (DE) ................ 10 2005 022 183

(51) Int. Cl.
*F24J 2/24* (2006.01)
(52) U.S. Cl. .................. 126/653; 126/651; 126/652; 126/654; 126/655; 126/694
(58) Field of Classification Search ................ 126/651, 126/652, 653, 654
See application file for complete search history.

(56) References Cited

U.S. PATENT DOCUMENTS 3,830,288 A * 8/1974 Laing .......................... 165/275

(Continued)

FOREIGN PATENT DOCUMENTS

CN 1495394 5/2004

(Continued)

OTHER PUBLICATIONS

Yu. I. Archakov, N. B. Sergeeva, and V. B. Nikolaevskii—Plenum Pubiishing Corporation (1990) Effect of Structure on Hydrogen Permeability in a Cast Heat-Resistant Steel at Elevated Temperatures and Pressures http://www.springerlink.com/content/rw88n277n010I320/fulltext.pdf.*

(Continued)

*Primary Examiner*—Kenneth B Rinehart
*Assistant Examiner*—Jorge Pereiro
(74) *Attorney, Agent, or Firm*—Michael J. Striker

(57) ABSTRACT

A tubular radiation absorbing device (1) designed for a solar heating application is described. The tubular radiation absorbing device has a metal central tube (3) and a glass tubular jacket (2) surrounding the central tube (3). A folding bellows (11) is connected between the central tube (3) and the tubular jacket (2), so that the tubular jacket and the central tube are movable relative to each other. A connecting element (20) connects an inner end of the folding bellows (11) with the central tube (3) and extends from the inner end of the folding bellows (11) through an inner annular space (30) between the folding bellows (11) and the central tube (3). The connecting element includes at least a part of a hydrogen window (50). A getter (6) is arranged in an outer annular space (33) between the folding bellows (11) and the tubular jacket (2).

18 Claims, 2 Drawing Sheets

U.S. PATENT DOCUMENTS

| | | | | |
|---|---|---|---|---|
| 4,142,509 | A | * | 3/1979 | Hermann et al. ............. 126/706 |
| 4,373,375 | A | * | 2/1983 | Terhune et al. ............. 73/19.01 |
| 4,546,798 | A | * | 10/1985 | Porta ............................ 138/149 |
| 4,708,124 | A | * | 11/1987 | Dorbeck ...................... 126/654 |
| 4,886,048 | A | * | 12/1989 | Labaton et al. ......... 165/104.27 |
| 4,987,883 | A | * | 1/1991 | Watkins et al. ............... 126/652 |
| 5,491,361 | A | | 2/1996 | Stupian et al. |
| 5,543,364 | A | * | 8/1996 | Stupian et al. ............. 438/115 |
| 5,624,598 | A | * | 4/1997 | Shepodd et al. ......... 252/182.12 |
| 6,673,400 | B1 | * | 1/2004 | Bedinger et al. ............ 428/34.1 |
| 6,705,311 | B1 | * | 3/2004 | Schwartzman et al. ...... 126/657 |
| 6,832,608 | B2 | * | 12/2004 | Barkai et al. ................. 126/653 |
| 2002/0075579 | A1 | * | 6/2002 | Vasylyev et al. ............. 359/853 |
| 2004/0050381 | A1 | * | 3/2004 | Kuckelkorn et al. ......... 126/690 |
| 2004/0134484 | A1 | * | 7/2004 | Barkai et al. ................. 126/653 |

FOREIGN PATENT DOCUMENTS

| | | |
|---|---|---|
| DE | 102 31 467 | 2/2004 |
| EP | 0 286 281 | 3/1988 |
| WO | 2004/063640 | 7/2004 |

OTHER PUBLICATIONS

Handbook of Gas Diffusion in Solids and Melts, pp. 104-113 (in English), Admitted Prior Art.

* cited by examiner

TUBULAR RADIATION ABSORBING DEVICE FOR SOLAR HEATING APPLICATIONS

CROSS-REFERENCE

The invention described and claimed hereinbelow is also described in German Patent Application 10 2005 022 183.1-15, filed May 9, 2005 in Germany, which provides the basis for a claim of priority under 35 U.S.C. 119.

BACKGROUND OF THE INVENTION

1. Field of the Invention

The present invention relates to a tubular radiation absorbing device for solar heating applications, especially for a parabolic collector in a solar heat collecting apparatus, which comprises a central tube, a glass tubular jacket surrounding the central tube so as to form a ring-shaped space between the tubular jacket and the central tube, at least one hydrogen window and an expansion compensating device connecting the central tube and the glass tubular jacket, so that they can move relative to each other in a longitudinal direction.

2. Description of the Related Art

Tubular radiation absorbing devices or absorber pipes are used in parabolic trough collectors to utilize solar radiation. The solar radiation is concentrated by a tracking mirror on a tubular radiation absorbing device and converted into heat. The heat is conducted away by a heat-carrying medium passing through the tubular radiation absorbing device and is used directly as process heat or converted into electrical energy.

A tubular radiation absorbing device with a central tube and a glass tubular jacket surrounding the central tube is known from DE 102 31 467 B4. A glass-metal transitional element is arranged on the free end of the glass tubular jacket. The central tube and the glass-metal transitional element are connected with each other by means of at least one expansion compensating device, so that they are movable relative to each other in the longitudinal direction. The expansion compensating device is arranged at least partially in an annular space between the central tube and the glass-metal transitional element. The expansion compensating device has two functions, namely, compensation for length changes due to thermal expansion of the central metal pipe and the glass tubular jacket and, at the same time, protection of the glass-metal transitional element from radiation reflected from the central metal pipe, so that no overheating can occur in this region and the vacuum-tight seal between the central tube and the glass tubular jacket is not compromised.

Because the expansion compensating device is not arranged in an axial direction next to or following the glass-metal transitional element, but under the glass-metal transitional element (i.e. next to or beside it in the radial direction), the structure is considerably shortened and at the same time reduces the shaded or blocked area of the tubular radiation absorbing device, which increases the performance of the tubular radiation absorbing device. A compact structure comprising the expansion compensating device and the glass-metal transitional element is thus formed, which guarantees a vacuum-tight seal in a simple way and makes unnecessary additional structural components, such as an interior diaphragm. For example, the expansion compensating device comprises a folding bellows.

The tubular radiation absorbing device requires a working temperature of between 300° C. and 400° C. for solar power generation. Thermo-oil flows through the tubular radiation absorbing device.

Free hydrogen, which dissolves in the thermo-oil, is generated by aging of the thermo-oil. This hydrogen reaches the evacuated ring-shaped space between the central tube and the glass tubular jacket by permeation through the central tube. The permeation rate increases with increasing operating temperature, whereby the pressure in the ring-shaped space also increases. This pressure increase leads to increased heat losses and a reduction of the efficiency of the tubular radiation absorbing device.

Suitable steps or measures are required to maintain the vacuum in the ring-shaped space. One such measure comprises elimination of the hydrogen in the ring-shaped space by combining it with. a suitable material. A getter is used for this purpose.

A getter arrangement is described in WO 2004/063640 A1, in which a getter bar is arranged in the ring-shaped space between the central tube and the tubular jacket. This arrangement has the disadvantage that the bar is in a region, which is exposed to direct radiation. Especially the getter bar could be heated by radiation coming from the mirror that misses the central tube or only glances off it and is reflected to a large extent. Since the getter bar is almost completely thermally isolated from the central tube and the tubular jacket in a vacuum, the temperature of the bar and thus the getter strongly fluctuates depending on the amount of incident radiation. Since the getter material with a given loading degree or content has a temperature-dependent equilibrium pressure (equilibrium between gas desorption and adsorption), temperature fluctuations of the getter lead to undesirable pressure fluctuations. Generally the characteristic parameters for getter materials are the adsorption rate and the equilibrium pressure. Both parameters increase generally with increasing temperature. A further disadvantage is that cylindrical press blanks are used, which decompose into a powdery state at higher hydrogen content. The powder distributes itself in the evacuated intervening space during use of the bar and that leads to impairment of the radiation transmission through the tubular jacket.

Another measure comprises removal of the hydrogen by conducting into the outside atmosphere. For example, EP 0 286 281 A1 describes insertion of a membrane of a material that has a high porosity for hydrogen and a low permeation rate for other gases between the vacuum and the outer atmosphere. The hydrogen can escape through this membrane into the outer atmosphere, without gases from the atmosphere entering into the vacuum. For this purpose the glass tubular jacket is provided with a tubular window, which is closed by means of a hydrogen-permeable palladium or palladium alloy window. A palladium tubule can be used for this window, which extends into the ring-shaped space. Alternatively the folding bellows, which is used as the expansion compensating device, can be coated with palladium.

A hydrogen window of this sort is generally exposed directly to incident solar radiation. Local heating of the glass tubular jacket, which can lead to breakage of glass, occurs because of strong heating by the solar radiation. It is known from experience with solar power plants in California that a failure rate of about 5% occurs because of this problem. Furthermore a hydrogen window that is arranged on the exterior of the tubular radiation absorbing device is exposed to exterior environmental influences like rain or dirt. Corrosion occurs because of exposure to rain water, which results in the destruction of the entire hydrogen window.

Also if the tube operator thus fails to uncover the hydrogen window, it can no longer perform its intended function.

SUMMARY OF THE INVENTION

It is an object of the present invention to provide a tubular radiation absorbing device, especially for a parabolic collector in a solar heat collecting apparatus, based on the tubular radiation absorbing device described in EP 0 286 281 A1, but which is characterized by a greater service life.

This object and others, which will be made more apparent hereinafter, are attained in a tubular radiation absorbing device for solar heating applications, especially for a parabolic collector in a solar heat collecting apparatus, which comprises a central tube, a glass tubular jacket surrounding the central tube so as to form a ring-shaped space between the tubular jacket and the central tube, at least one hydrogen window and an expansion compensating device connecting the central tube and the glass tubular jacket so that they can move relative to each other in a longitudinal direction.

According to the invention the expansion compensating device has an inner end connected by a connecting element with the central tube and the connecting element extends from the inner end of the expansion compensating device through an annular interior space formed between the central tube and the expansion compensating device; and wherein the connecting element comprises at least a part of the at least one hydrogen window.

The hydrogen window is thus protected from incident solar radiation by the expansion compensating element and the connecting element, so that local heating and resulting damage cannot occur. Furthermore the hydrogen window is arranged so that it is protected from other environmental influences, such as rainwater. These measures or steps decisively extend the service life of the tubular radiation absorbing device.

The hydrogen window is arranged in the immediate vicinity of the central tube. The hydrogen window has an operating temperature, which is guaranteed to be over 200° C. as a result of the proximity to the central tube. The permeation rate of hydrogen is thus considerably higher than that of the hydrogen window of the prior art. An additional advantage achieved by constraining the hydrogen window to the temperature of the central tube is that the permeation rate of the window is correlated with the permeation rate of the tubular radiation absorbing device.

Preferably the connecting element extends at least up to the vicinity of the outer end of the expansion compensating device. The connecting element can extend beyond the outer end of the expansion compensating device. This has the advantage that a larger region is available under the expansion compensating device for arrangement of the hydrogen window.

A first annular space, which preferably has a width of from 1 to 10 mm, especially from 1 to 2 mm, is found between the connecting element and the central tube. A part of the hydrogen emitted from the central tube thus reaches the immediate vicinity of the hydrogen window. Moreover the hydrogen issuing from the central tube is equally distributed over the surface of the central tube. The resulting distribution of hydrogen in the ring-shaped space is uniform due to the operating temperature and the high mobility of hydrogen.

The hydrogen window preferably comprises palladium or a palladium window. The hydrogen window can be entirely made from palladium or a palladium alloy. However it is also possible to use a substrate of steel, nickel, niobium, titanium or their alloys and to coat it on the inside and/or outside with palladium or palladium alloy.

The entire hydrogen window is preferably completely under the expansion compensating device, i.e. between the expansion compensating device and the central tube. This guarantees a complete shielding of the hydrogen window from incident solar radiation.

According to a further preferred embodiment a section of the hydrogen window extends partly into the ring-shaped space between the central tube and the tubular jacket. The hydrogen window is only partially arranged in the connecting element and extends out beyond the connecting element, so that the hydrogen window is exposed on both sides. This section of the hydrogen window is in contact on both sides with the inner atmosphere of the ring-shaped space, so that a larger surface is available for uptake of hydrogen, which can be released to the outside by the remaining section, which is located in the connecting element.

The window according to the invention is preferably combined with a getter, which is arranged in an outer annular space between the central tube and the glass tubular jacket.

The employed getter material of at least one getter is adjusted to the operating temperature of the installed position. The getter material gives off hydrogen at higher temperatures. The amount of the hydrogen given off depends on the temperature and loading degree of the getter. It is of advantage when the activating temperature is below the operating temperature, in order to avoid passivation of the getter. Preferably an activation temperature under 150° C. is used. The installed position is advantageously selected so that the activation of the getter can occur from the outside by heating. For example this can be achieved in operation by removing a protective plate covering the internal end parts in the tubular radiation absorbing device and on the outer end of the tubular radiation absorbing device for a short time.

If free hydrogen is present in a sufficient amount in the evacuated glass tubular jacket so that gas heat conduction occurs, the hydrogen window and the getter material are heated, whereby the permeation of the hydrogen window increases and a getter self-releasing mechanism occurs in operation. The getter releases hydrogen until the temperature and loading degree exceed certain critical limits. The release mechanism can also be forced by removal of the protective plate as described above.

Preferably the getter is arranged in a section of the outer annular space between the expansion compensating device and the glass-metal connecting element in embodiments of the tubular radiation absorbing device, in which the outer end of the expansion compensating device is connected by means of a glass-metal connecting element with the glass tubular jacket.

The hydrogen window and getter are thus both arranged within the end portion of the tubular radiation absorbing device so that an annular space is present between both parts, which is called a second annular space and which is connected to the outer atmosphere and thus filled with air. A temperature difference arises between the getter and the hydrogen window because of this second annular space between them. The operating temperature of the hydrogen window is higher than the operating temperature of the getter because of this temperature difference. The temperature of the palladium window was found to be between 250° C. and 350° C. and the temperature of the getter was found to be between 100° C. and 200° C. when the fluid temperature was measured to be from 300° C. and 400° C.

The glass-metal transitional element preferably has a circumferential collar on its outer end, which is connected by an annular disk with the outer side of the expansion compensating device. Preferably the glass-metal transitional element has a circumferential step and the getter is axially fixed between the circumferential step and the annular disk.

BRIEF DESCRIPTION OF THE DRAWING

The objects, features and advantages of the invention will now be described in more detail with the aid of the following description of the preferred embodiments, with reference to the accompanying figures in which.

DETAILED DESCRIPTION OF THE INVENTION

Figure 1:
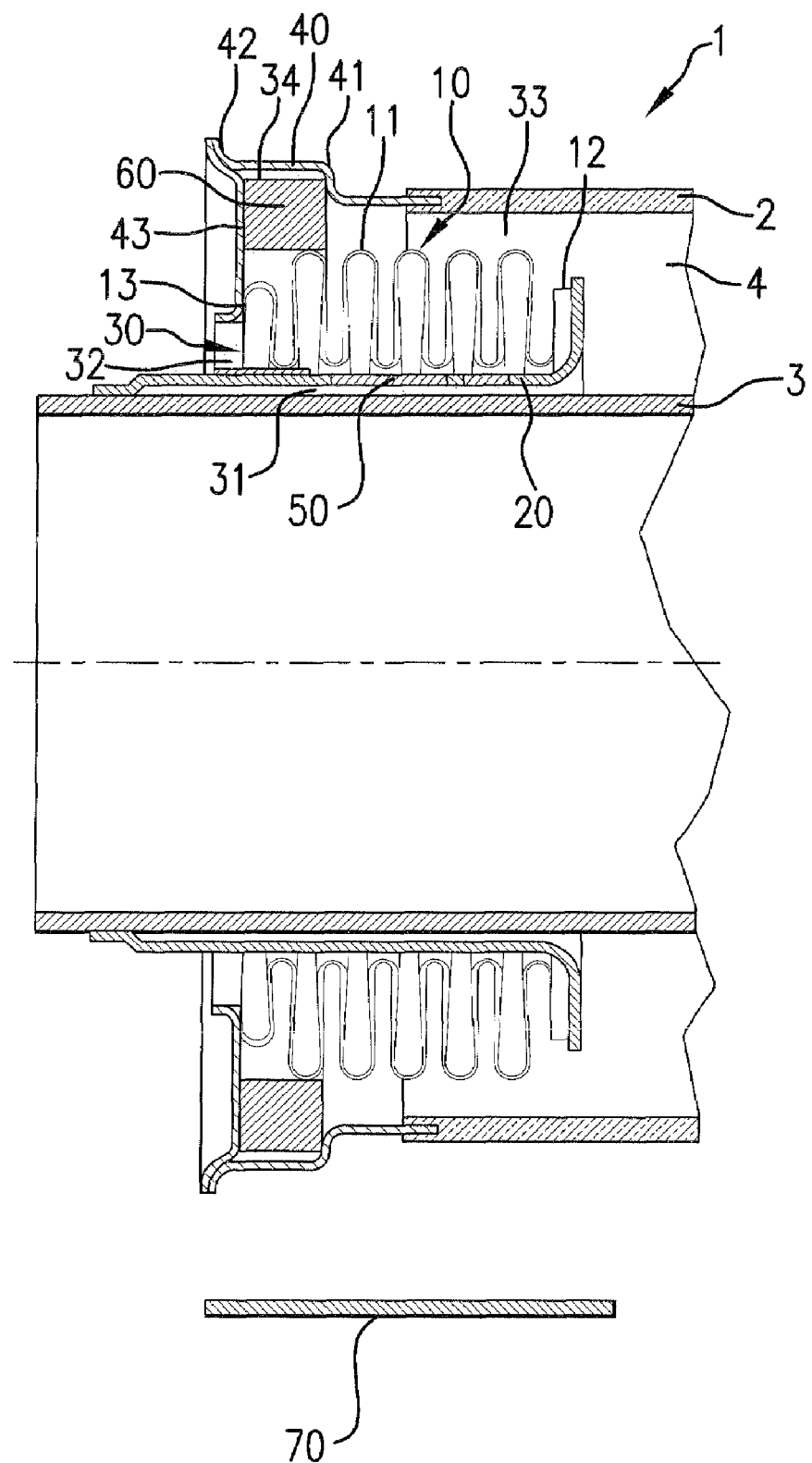
FIG. 1 is a cutaway longitudinal cross-sectional view through a tubular radiation absorbing device according to a first embodiment of the invention.

A longitudinal cross-sectional view through an end portion of the tubular radiation absorbing device 1 is shown in FIG. 1. The tubular radiation absorbing device 1 has a glass tubular jacket 2 and a central metal pipe 3 arranged concentrically in the glass tubular jacket 2. A radiation-selective coating for absorption of the solar radiation is preferably provided on the outside of the central metal pipe 3.

A glass-metal transitional element 40, which has a circumferential collar 42 pointing toward the outside, is welded with an annular disk 43.

An expansion compensating device 10 is provided for compensating the differing thermal expansion properties of the central metal pipe 3 and the glass tubular jacket 2. The expansion compensating device 10 comprises a folding bellows 11, which is arranged in a ring-shaped space 4 between the central tube 3 and the tubular jacket 2. The radially interior edge or end of the annular disk 43 is attached with the outer side of the expansion compensating device 10.

The inner end 12 of the folding bellows 11 is attached to a connecting element 20. This connecting element 20 extends in an inner annular space 30 between the folding bellows 11 and the central tube 3. The connecting element 20 extends out from the inner annular space 30 and beyond the outer end 13 of the folding bellows 11 and is connected with the central tube 3 in a vacuum-tight manner. The inner annular space 30 is divided into a first annular space 31 between the central tube 3 and the connecting element 20 and a second annular space 32 between the connecting element 20 and the folding bellows 11.

The end of the tubular radiation absorbing device 1 is also covered by a protective tube 70 (see FIGS. 1 and 2), whose axial extent corresponds approximately to the length of the folding bellows 11. The protective tube 70 can be held on the tubular jacket 2 or the glass-metal transitional element 5 and prevents radiation from directly striking the folding bellows 11.

A hydrogen window 50 is arranged in the connecting element 20. The hydrogen window 50 for example comprises a palladium or palladium alloy membrane. The entire hydrogen window 50 is arranged under the folding bellows 11 and thus is protected from incident solar radiation. The hydrogen passing through the hydrogen window 50 arrives in the second annular space 32, which is connected with the outer atmosphere.

The first annular space 31 has a radial width of about 2 mm, so that it is tied to the temperature of the central tube 3.

Figure 2:
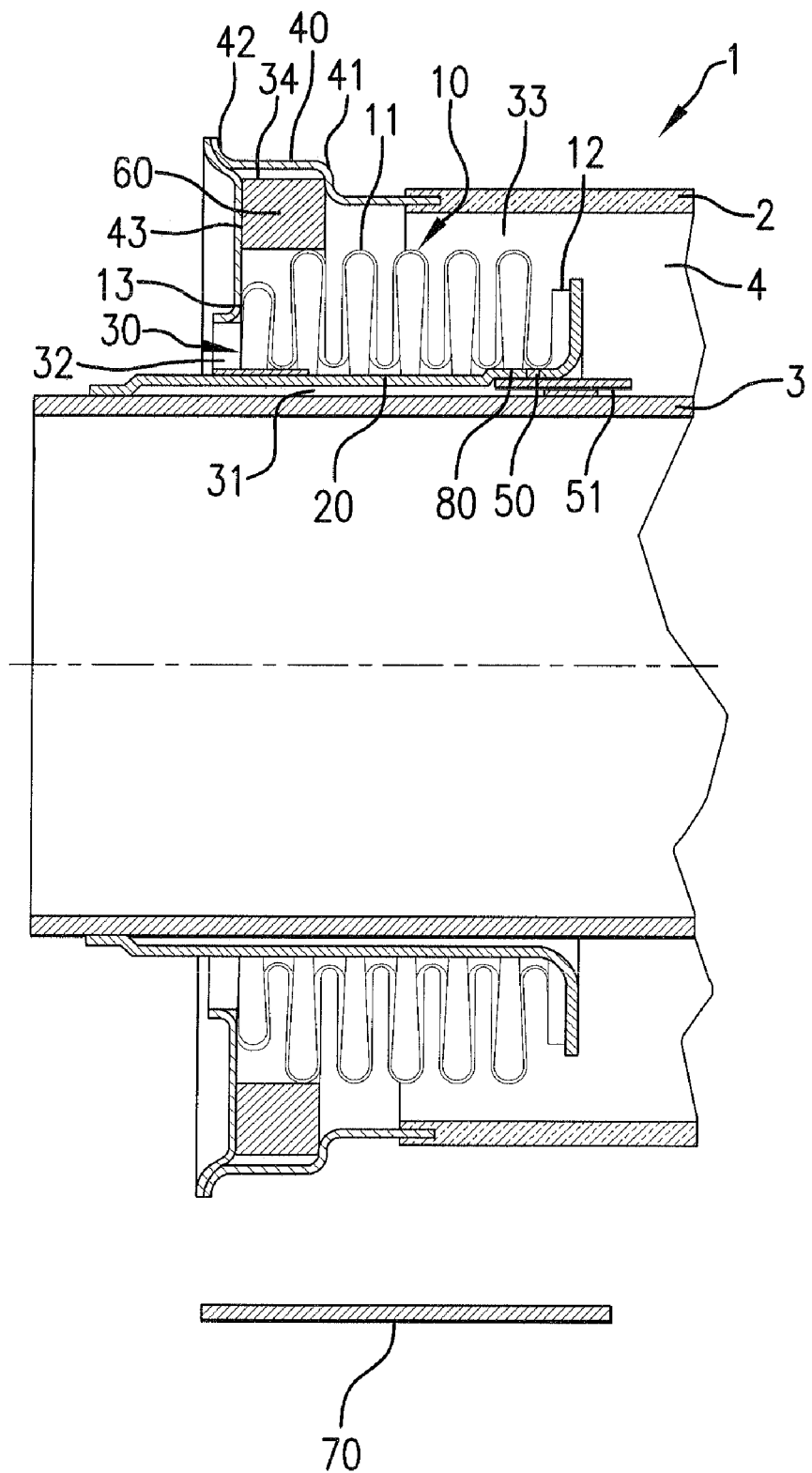
FIG. 2 is a cutaway longitudinal cross-sectional view through a tubular radiation absorbing device according to a second embodiment of the invention.

In order to increase the first annular space 31 in the vicinity of the palladium window, a circumferential step can be provided in the connecting element 20 as shown in FIG. 2.

A getter 60 is arranged in an outer annular space 33 between the following bellows 11 and the glass-metal transitional element 40. The glass-metal transitional element 40 has a circumferential step 41. The getter 60 is axially fixed in a section 34 of the outer annular space 33, which is located between the circumferential step 41 of the glass-metal transitional element 41 and the annular disk 43. The getter 60 is protected from incident solar radiation by the glass-metal transitional element 40 and from reflected radiation by the folding bellows 11 and the connecting element 20. A compact structure is thus provided by the arrangement of the hydrogen widow 50, expansion compensating device 10 and the getter 60 next to each other in the radial direction.

A second embodiment is shown in FIG. 2, which differs from the embodiment shown in FIG. 1, in that the hydrogen window 50 arranged in the connecting element 20 extends with a section 51 into the ring-shaped space 4. Because of that the first annular space 31 extends into the ring-shaped space 4. The surface area available for up-take of hydrogen is thus increased by means of the section 51.

The connecting element 20 has a radial step 80 (FIG. 2), in order to widen the first annular space 31 for introduction of the hydrogen window 50 there.

Since the hydrogen window is arranged on the side that is comparatively far from the mirror (not shown) and the part projecting into the ring-shaped space 4 is close to the central tube 3, direct irradiation with concentration solar energy is avoided.

PARTS LIST 1 tubular radiation absorbing device
2 tubular jacket
3 central tube
4 ring-shaped space
10 expansion compensating device
11 folding bellows
12 inner end
13 outer end
20 connecting element
30 inner annular space
31 first annular space
32 second annular space
33 outer annular space
34 section of the outer annular space 33
40 glass-metal transitional element
41 circumferential step
42 circumferential collar
43 annular disk
50 hydrogen window
51 section of the hydrogen window
60 getter
70 protective tube
80 radial step The disclosure in German Patent Application 10 2005 022 183.1-15 of May 9, 2005 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a tubular radiation absorbing device for solar

What is claimed is new and is set forth in the following appended claims:

1. A tubular radiation absorbing device for solar heating applications, which comprises a central tube (3);

a glass tubular jacket (2) surrounding the central tube (3) so as to form a ring-shaped space (4) between the tubular jacket and the central tube;

an expansion compensating device (10) connected between the central tube (3) and the glass tubular jacket (2), so that the tubular jacket and the compensating device are movable longitudinally relative to each other and so as to form an inner annular space (30) between the central tube (3) and the expansion compensating device (10);

a connecting element (20) connecting an inner end (12) of the expansion compensating device (10) with the central tube (3) and extending from the inner end (12) of the expansion compensating device through said inner annular space (30), wherein said inner annular space (30) is divided into a first annular space (31) between the central tube (3) and the connecting element (20) and a second annular space (32) between the connecting element (20) and the expansion compensating device (10), said second annular space (32) being connected with an outer atmosphere; and at least one hydrogen window (50) arranged in the connecting element (20) so that the at least one hydrogen window (50) is protected from incident solar radiation by the expansion compensating device (10) and so that hydrogen collecting in the first annular space (31) passes through the at least one hydrogen window (50) into the second annular space (32) and subsequently escapes into the outer atmosphere.

2. The tubular radiation absorbing device as defined in claim 1, wherein the connecting element (20) extends at least up to the vicinity of an outer end (13) of the expansion compensating device (10).

3. The tubular radiation absorbing device as defined in claim 1, wherein the first annular space (31) has a width of from 1 to 10 mm.

4. The tubular radiation absorbing device as defined in claim 3, wherein said width is from 1 to 2 mm.

5. The tubular radiation absorbing device as defined in claim 1, wherein said at least one hydrogen window (50) comprises palladium or a palladium alloy.

6. The tubular radiation absorbing device as defined in claim 1, wherein an entire portion of the at least one hydrogen window (50) is radially between the central tube (3) and the expansion compensating device (10) so that the at least one hydrogen window is completely protected from said solar radiation by said expansion compensating device.

7. The tubular radiation absorbing device as defined in claim 1, wherein the hydrogen window (50) has a section (51) extending into the ring-shaped space (4) and the hydrogen window (50) is arranged on a side of the central tube (3) so that direct irradiation with concentrated solar energy is avoided.

8. The tubular radiation absorbing device as defined in claim 1, wherein at least one getter (60) is arranged in an outer annular space (33) between the tubular jacket (2) and the central tube (3).

9. The tubular radiation absorbing device as defined in claim 1, wherein the central tube (3) is a metal tube and further comprising a glass-metal transitional element (40) connecting an outer end (13) of the expansion compensating device (10) with the glass tubular jacket (2).

10. The tubular radiation absorbing device as defined in claim 9, wherein a getter (60) is arranged in a section (34) of the outer annular space (33) between the expansion compensating device (10) and the glass-metal transitional element (40).

11. The tubular radiation absorbing device as defined in claim 10, wherein the glass-metal transitional element (40) has a circumferential collar (42) on an outer end thereof and the circumferential collar (42) is connected to an outer end (13) of the expansion compensating device (10) by an annular disk (43).

12. The tubular radiation absorbing device as defined in claim 10, wherein the glass-metal transitional element (40) has a circumferential step (41).

13. The tubular radiation absorbing device as defined in claim 12, wherein the getter is axially connected between the circumferential step (41) and an annular disk (43), said annular disk (43) connecting an outer end of the expansion compensating device (10) to an outer end of the glass-metal transitional element (40).

14. The tubular radiation absorbing device as defined in claim 10 wherein the getter comprises a low-activation-energy material.

15. The tubular radiation absorbing device as defined in claim 1, wherein the central tube (3) is a metal tube.

16. The tubular radiation absorbing device as defined in claim 1, wherein the expansion compensating device (10) is a folding bellows (11).

17. The tubular radiation absorbing device as defined in claim 1, and formed as part of a parabolic trough collector in a solar heating plant.

18. The tubular radiation absorbing device as defined in claim 1, wherein said at least one hydrogen window (50) is arranged sufficiently close to said central tube (3) so that in operation said at least one hydrogen window (50) has a temperature over 200° C.

* * * * *